US010996346B2

(12) United States Patent
Sawada et al.

(10) Patent No.: US 10,996,346 B2
(45) Date of Patent: May 4, 2021

(54) α-RAY MEASURING DEVICE

(71) Applicant: MITSUBISHI MATERIALS CORPORATION, Tokyo (JP)

(72) Inventors: Yoshinori Sawada, Sanda (JP); Ichiro Shiono, Sanda (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/049,404

(22) PCT Filed: Apr. 22, 2019

(86) PCT No.: PCT/JP2019/016962
§ 371 (c)(1),
(2) Date: Oct. 21, 2020

(87) PCT Pub. No.: WO2019/208477
PCT Pub. Date: Oct. 31, 2019

(65) Prior Publication Data
US 2021/0055430 A1 Feb. 25, 2021

(30) Foreign Application Priority Data

Apr. 26, 2018 (JP) .............................. JP2018-085861

(51) Int. Cl.
*G01T 1/16* (2006.01)
(52) U.S. Cl.
CPC ....................... *G01T 1/16* (2013.01)
(58) Field of Classification Search
CPC ....................................................... G01T 1/16
See application file for complete search history.

(56) References Cited

U.S. PATENT DOCUMENTS

| 4,264,816 A * | 4/1981 | Walenta .................. H01J 47/02 |
| | | 250/374 |
| 4,965,861 A | 10/1990 | Filthuth |
| 5,019,711 A | 5/1991 | Antonuk |
| 9,217,793 B2 * | 12/2015 | Zhou ....................... G01T 3/008 |

(Continued)

FOREIGN PATENT DOCUMENTS

| CN | 200982957 Y | 11/2007 |
| CN | 103380194 A | 10/2013 |

(Continued)

OTHER PUBLICATIONS

International Search Report dated Jul. 16, 2019, issued for PCT/JP2019/016962.

(Continued)

Primary Examiner — Hugh Maupin
(74) Attorney, Agent, or Firm — Locke Lord LLP

(57) ABSTRACT

An α-ray measuring device which is provided with: a box-shaped chamber that has a gas inlet and a gas outlet; a cathode film which is provided within the box-shaped chamber; a plurality of anode wires which are arranged parallel to each other at a distance from the cathode film, while being electrically connected to each other and having a diameter of from 1 μm to 30 μm (inclusive); and a plurality of cathode wires which are arranged parallel to each other at a distance from the anode wires, while being electrically connected to the cathode film and having a diameter of from 1 μm to 30 μm (inclusive).

20 Claims, 2 Drawing Sheets

(56) References Cited

U.S. PATENT DOCUMENTS

| | | | |
|---|---|---|---|
| 2005/0194541 A1* | 9/2005 | Clark | ............... G01T 1/185 250/385.1 |
| 2013/0306874 A1 | 11/2013 | Yoshikawa et al. | |
| 2017/0010365 A1 | 1/2017 | Maekawa et al. | |

FOREIGN PATENT DOCUMENTS

| | | |
|---|---|---|
| CN | 103926615 A | 7/2014 |
| CN | 106338758 A | 1/2017 |
| JP | S61-54489 A | 3/1986 |
| JP | S63-238587 A | 10/1988 |
| JP | H01-211852 A | 8/1989 |
| JP | H05-41196 A | 2/1993 |
| TW | 201233283 A | 8/2012 |
| TW | I533776 B | 5/2016 |

OTHER PUBLICATIONS

Office Action dated Feb. 9, 2021, issued for the corresponding Chinese Patent Application No. 201980027258.1.
Search Report dated Feb. 23, 2021, issued for TW108114258.

* cited by examiner

α-RAY MEASURING DEVICE

BACKGROUND OF THE INVENTION

Technical Field

The present invention relates to an α-ray measuring device belonging to a 2n-type gas flow proportional counter tube that uses a planar cathode to apply a high voltage while flowing gas to measure α-rays.

Priority is claimed on Japanese Patent Application No. 2018-085861, filed Apr. 26, 2018, the content of which is incorporated herein by reference.

Background Art

High accuracy electronic circuits are applied on various fields accompanying with highly advancing information equipment. As a result, frequency of soft errors in the electronic circuits has a large influence on safety in the automobile field and transmission quality of information in the information communication field. There are some reasons of increasing the frequency of soft errors. Among them, it is known that α-ray is irradiated to a semiconductor element from a bonding material bonding the semiconductor forming the electronic circuit to a circuit substrate board, so that the semiconductor element functions incorrectly. Therefore, bonding the semiconductor on the circuit substrate board in practice, it is necessary to verify in advance that an emission amount of the α-ray of the bonding material of the semiconductor is desirable.

A 2π-type gas flow proportional counter tube is a type of devices measuring the α-ray, in which a sample of a measurement object is disposed in a box-shaped chamber in which an anode and a cathode which are a linear shape and a cathode which is a surface shape are arranged, to measure α-ray utilizing ionization of gas by applying high voltage between the cathodes and the anode while flowing gas.

For example, the gas inlet 2π gas flow counter tube disclosed in Patent Document 1 has a structure in which a cathode board, a multi-linear anode, multi-linear cathode and a sample table are arranged in order from the top in a box-shape chamber having a gas introducing outlet. In this case, the cathode board, the anode, and the multi-linear cathode at the lower part are made of conductive material with a small content of a radioactive element of α-ray. As the cathode board, ultrahigh purity copper, a plastic board on which metal such as aluminum or the like is deposited, ultrahigh purity metal plating board and the like are used; and as the anode, stainless steel with a wire diameter of 10 to 200 μm, thin wires of copper or the like are used.

An interval between the thin wires of the anode is set to 2 to 3 mm; and a distance between the anode and the respective cathodes is set to 1 to 2 cm. As the multi-linear cathode at the lower part, one having a wire diameter 50 to 100 μm of the same material as in the anode is used, and it is described that it has a good counting efficiency by setting an interval to 5 to 20 mm. A distance between a measured surface of the sample and the multi-linear cathode at the lower part is described to be 3 to 6 mm.

CITATION LIST

Patent Literature

Patent Document 1 Japanese Unexamined Patent Application, First Publication No. S61-54489

SUMMARY OF INVENTION

Technical Problem

It is possible to count a certain degree of an emission amount of α-ray of various materials by the α-ray measuring device using the gas inlet 2π gas flow counter tube disclosed in Patent Document 1. However, recently, it is demanded for bonding material of semiconductor to have an extremely small emission amount of α-ray; therefore, a device which can count the low α-ray emission amount is required, such as 0.001 cph/cm$^2$, for example. For the device disclosed in Patent Document 1, it is difficult to measure and verify the low α-ray emission amount of 0.001 cph/cm$^2$ or lower with high reliability; even if it is possible to measure, a measuring time of 100 hours or more, for example, is necessary.

The present invention is achieved in consideration of the above circumstances, and has an object to provide an α-ray measuring device which can measure the low emission amount of α-ray such as 0.001 cph/cm$^2$ or lower for example with high reliability.

Solution to Problem

An α-ray measuring device of the present invention is provided with a box-shaped chamber having a gas inlet and a gas outlet; a cathode film provided inside the box-shaped chamber; a plurality of anode wires, arranged in parallel to the cathode film with a distance and also in parallel to each other with a distance, electrically connected to each other, and having a diameter of 30 μm or less; and a plurality of cathode wires, arranged in parallel to the anode wires with a distance and also in parallel to each other with distance, electrically connected to the cathode film, and having a diameter of 30 μm or less.

The countering efficiency of the α-ray changes depending on applied voltage. In a relation between the applied voltage and the counting efficiency of radioactive rays, there is a region called a plateau in which the counting efficiency less changes and almost constant in a certain voltage range. Generally, it is preferable to set the applied voltage for measuring α-ray to a minimum voltage in the plateau region. By contrast, in order to measure a very small amount of α-ray, it is necessary to lower a background level of the measuring device. In order to lower the background level, it is necessary to lower the applied voltage. However, if the voltage is lowered than the minimum voltage in the plateau region, the counting efficiency is also decreased.

In contrast, the Inventors of the present invention found that the plateau region shifts to lower voltage side by thinning the diameter of the anode wires and the diameter of the cathode wires as 30 μm or less. Thereby α-ray can be measured by lower applied voltage without decreasing the counting efficiency, the background is reduced, and a sample of a low emission amount of α-ray can be measured in a short time. If the diameters excess 30 μm, the plateau region does not shift enough to the lower voltage side, so that it is difficult to measure the sample of the low emission amount of α-ray in a short time under the influence of the background.

Minimum values of the diameter of the anode wires and the diameter of the cathode wires are preferably 2 μm.

As one aspect of the α-ray measuring device, it is preferable that the diameter of the anode wires and the diameter of the cathode wires be the same. Thereby intervals of an electric field formed between the electrodes are even, and the counting efficiency is stabilized.

As another aspect of the α-ray measuring device, a distance between the cathode film and the anode wires, and a distance between the anode wires and the cathode wires are both not less than 3 mm and less than 10 mm.

If these distances are less than 3 mm, there is a concern that the background is increased and the measurement in the low voltage is difficult; and it is difficult to assembly the measuring device because the electrodes are close. If the distances are 10 mm or more, noise is easy to be occurred, and the background may be also increased. The distances between the anode wires and the cathode wires are more preferably not less than 3 mm and not more than 9 mm.

As another aspect of the α-ray measuring device, a wire distance between the anode wires is not less than 10 mm and less than 20 mm and a wire distance between the cathode wire is not less than 5 mm and not more than 10 mm.

Regarding the anode wires, if the wire distances are less than 10 mm, there is a concern that the electric fields interfere and the background is increased; if it is 20 mm or more, there is a concern that a distance of the electric fields formed by the anode wires is large and the counting efficiency is deteriorated. If the counting efficiency is deteriorated, it is necessary to increase the applied voltage; however, in the case, the background is increased and a desired performance cannot be obtained.

Also in the cathode wires, if the wire distance is less than 5 mm, the background of the measuring device may be increased; if it is more than 10 mm, the counting efficiency may be deteriorated because the wire distance is too large.

It is preferable that the wire distance of the anode wires be not less than 10 mm and not more than 19 mm, and the wire distance of the cathode wires be not less than 5 mm and not more than 9 mm.

Another aspect of the α-ray measuring device is provided with: between an inner surface of the box-shaped chamber and the anode wires, a plurality of rods made of insulation material and a plurality of supporting conductive wires made of conductive material with a content of α-ray emission element less than 1 ppb, fixed on the supporting rods and both ends of the anode wires, holding the anode wires and electrically connecting the anode wires to each other are provided; and the supporting rods include an inner insulation part having a rod shape in which a part penetrates a hole formed on the cathode film and is exposed in the box-shaped chamber, and an insulation covering part covering the exposed part of the inner insulation part in the box-shaped chamber.

There is a concern that the outer peripheral surface of the inner insulation part is in contact with the cathode film and a part of the cathode film (powder and the like) is adhered thereon when penetrating the hole of the cathode film; therefore, by covering the part exposed within the box-shaped chamber with the insulation covering part, the insulation is improved and a conductive path (a conduction route) is prevented from forming on a surface of the supporting rods, and the noise is reduced.

Another aspect of the α-ray measuring device is provided with conductive bonding material fixing bonded parts of the anode wires and the supporting conductive wires.

Although the anode wires are thin, by bonding the bonded parts of the supporting conductive wires with the conductive bonding material, the anode wires can be prevented from being deformed and broken, and it is possible to ordinally arrange in a state in which appropriate tension.

As another aspect of the α-ray measuring device, the gas inlet and the gas outlet are formed on side board parts between the cathode wires and a bottom surface in the box-shaped chamber.

Since the flow in the box-shaped chamber accompanying with the gas flow is made not to largely influence the cathode wires and the anode wires, the thin anode wires and the thin cathode wires are prevented from vibrating and deforming, and the measuring accuracy can be improved.

Advantageous Effects of Invention

According to the present invention, by the anode wire and the cathode wire having the thin diameter of 30 μm or lower, without decreasing the counting efficiency, α-ray can be measured with lower applied voltage, the back ground is reduced, and the sample of the low emission amount of α-ray can be measured in a short time.

DESCRIPTION OF EMBODIMENTS

Figure 1:
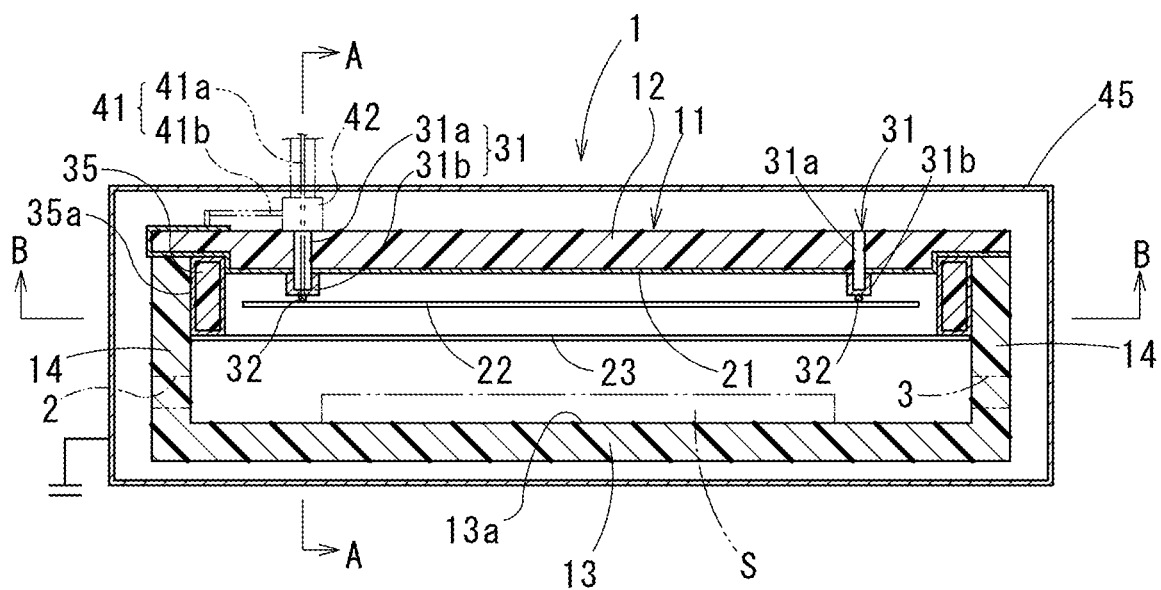
FIG. 1 is a vertical cross-sectional view showing one embodiment of an α-ray measuring device of the present invention.
Figure 2:
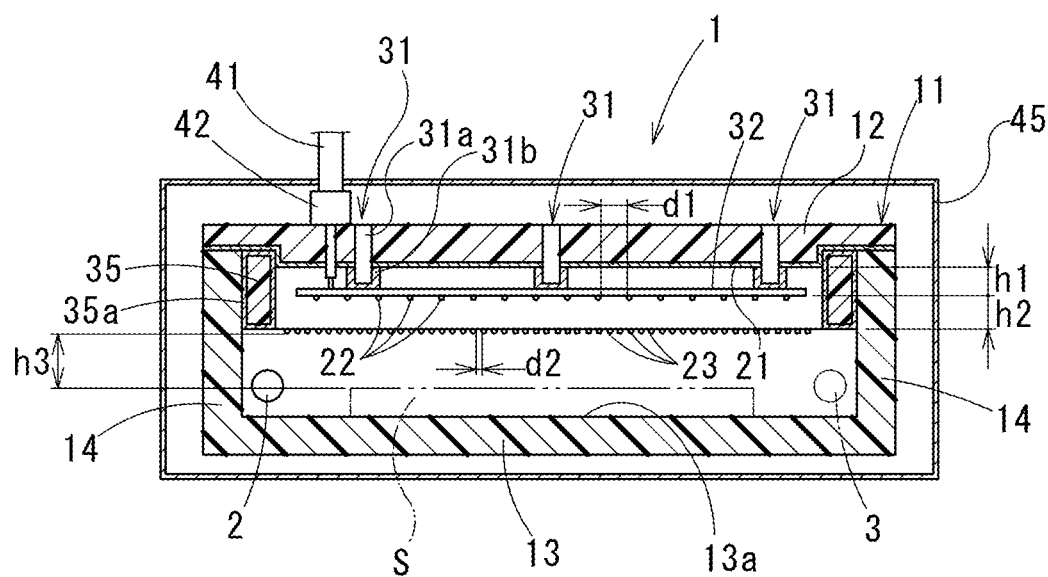
FIG. 2 is an arrow cross-sectional view taken along the line A-A in FIG. 1.

Below, an embodiment of the present invention will be explained referring to drawings. An α-ray measuring device 1 of the present embodiment is provided with: a box-shaped chamber 11 having a gas inlet 2 and a gas outlet 3; a cathode film 21 formed on an inner surface (a ceiling surface) of a top board part 12 of the box-shaped chamber 11; a plurality of anode wires 22 which are arranged parallel to and electrically connected to each other with an interval and being parallel to the cathode film 21 with a distance; a plurality of cathode wires 23 which are arranged parallel to the anode wires 22 with a distance and being parallel to each other with an interval, and electrically connected to the cathode film 21, as shown in FIG. 1 to FIG. 3.

The box-shaped chamber 11 is formed to be a rectangular shape having a bottom board part 13, side board parts 14 surrounding all directions, and the top board part 12. The bottom board part 13, the side board parts 14, and the top board part 12 of the box-shaped chamber 11 are made of synthetic resin such as acrylic resin or the like. On the whole inner surface (the ceiling surface) of the top board part 12, the cathode film 21 is formed by spattering or the like.

The anode wires 22 are provided in parallel to the cathode film 21. Supporting rods 31 are provided to support the anode wires 22, penetrating both sides of the top board part 12 (the cathode film 21) and arranged in two rows along sides of the top board part 12. On tip ends of these two rows of the supporting rods 31 (lower ends in FIGS. 1 and 2), supporting conductive wires 32 are fixed along the rows in parallel to each other.

Figure 3:
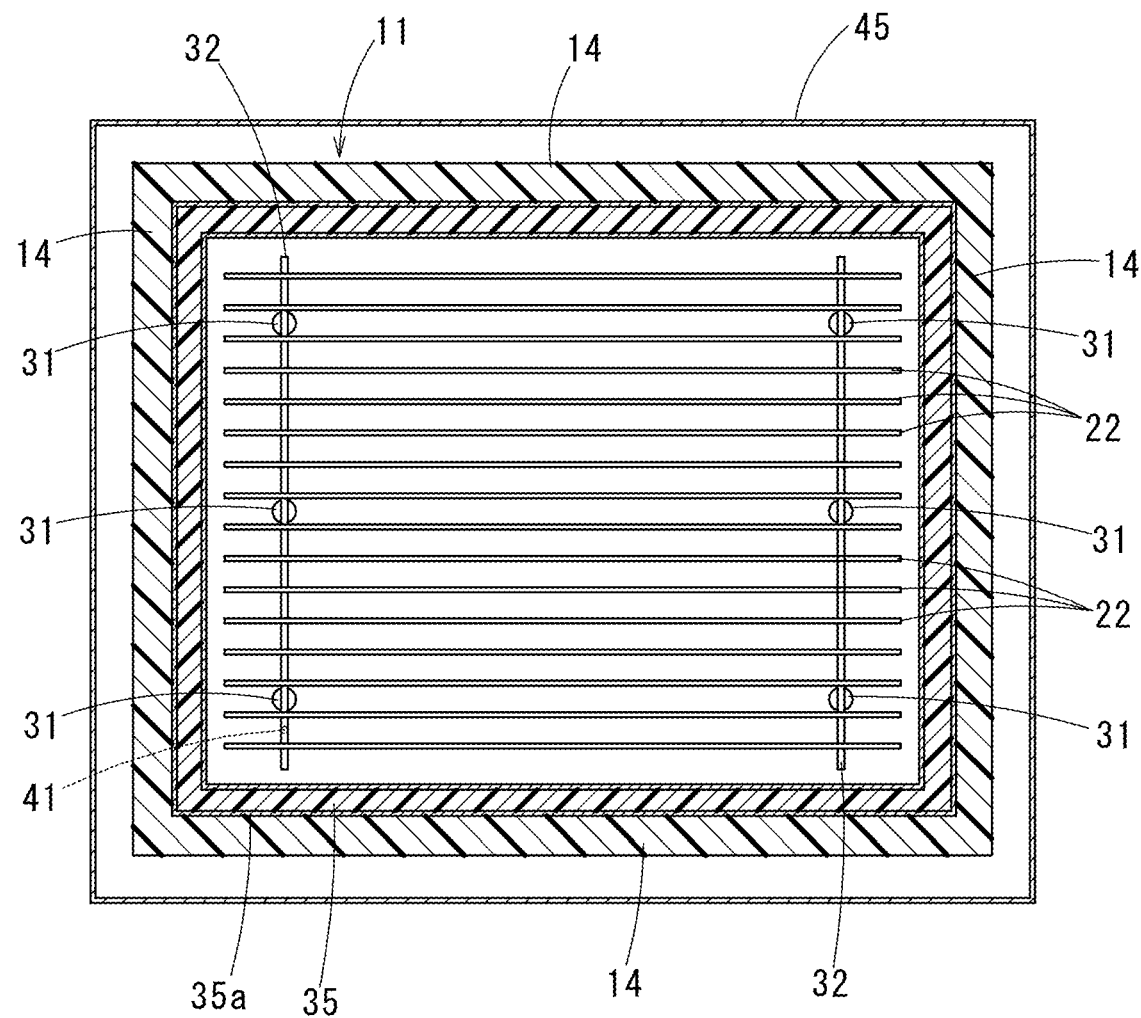
FIG. 3 is an arrow cross-sectional view taken along the line B-B in FIG. 1.

As shown in FIG. 3, since the supporting rods 31 are provided in two rows, the supporting conductive wires 32 are disposed two in total one by one for each row of the supporting rods. The anode wires 22 are provided so as to span the supporting conductive wires 32.

In other words, between the inner surface of the box-shaped chamber 11 and the anode wires 22, a plurality of the supporting rods 31 made of insulation material and a plurality (two in this embodiment) of the supporting conductive wires 32 fixed on the respective 31 are provided. The anode wires 22 are held on the supporting conductive wires 32 by fixing both ends on the supporting conductive wires 32. The supporting conductive wires 32 are made of conductive material with a content of an α-ray emission element of less than 1 ppb and electrically connect the anode wires 22 to each other.

The supporting rods 31 are formed from a rod body (an inner insulation part) 31a penetrating the top board part 12 of the box-shaped chamber 11 and the cathode film 21 and an insulation covering part 31b formed to cover a part penetrating the top board part 12 and exposed in the box-shaped chamber 11. The supporting conductive wires 32 are fixed on the insulation covering part 31b.

In other words, the supporting rods 31 include the rod body 31a in which a part thereof penetrates a hole formed on the cathode film 21 and exposed in the box-shaped chamber 11 and the insulation covering part 31b covering the exposed part of the rod body 31a in the box-shaped chamber 11. The rod body 31a is covered with the insulation covering part 31b; and the cathode film 21 through which the rod body 31a penetrate and the supporting conductive wires 32 fixed on the insulation covering part 31b are reliably insulated.

The anode wires 22 are arranged between the supporting conductive wires 32 at the tip end of the supporting rods 31 in parallel to each other along a direction perpendicular to the supporting conductive wires 32 with a constant interval, to form a parallel surface with the constant distance with the cathode film 21. Thereby an electric field can be formed with a large area.

The supporting conductive wires 32 and the anode wires 22 are connected electrically and mechanically by conductive bonding material (not illustrated) of any one type of Ag, Ni, Cu, Al, and Au. The conductive bonding material is formed by, for example, in a case of silver-type bonding material, specifically, applying silver paste made of silver-type powder and resin and the like and solidifying. Bonded parts of the supporting conductive wires 32 and the anode wires 22 are further reinforced by adhering adhesive agent such as epoxy resin or the like. The connection of the supporting conductive wires 32 and the anode wires 22 may be a structure of directly tying and screw clamping, a structure of crimping by metallic parts, and the like.

As shown in FIGS. 2 and 3, to the anode wires 22 and the cathode film 21, a cable 41 is connected for connecting to an external power source (not illustrated). The cable 41 is a coaxial cable for example, includes an inner conductive wire 41a and an outer conductive wire 41b insulated from the inner conductive wire 41a, and fixed on the top board part 12 of the box-shaped chamber 11 by a connector 42. The inner conductive wire 41a is electrically connected to the supporting conductive wires 32 by the connector 42; and the outer conductive wire 41b is electrically connected to the cathode film 21 by the connector 42.

The gas inlet 23 is fixed on a rectangular frame member 35 provided inside the box-shaped chamber 11. The frame member 35 is made of synthetic resin such as acrylic resin, in which a conductive film 35a made of conductive material is formed on a whole surface by spattering or the like, and fixed on the inner surface of the side board parts 14 in a state of being joined to the cathode film 21 of the top board part 12. On lower ends of two sides opposite with 180° in the frame member 35, a plurality of the gas inlet 23 are provided in parallel to each other in a state of spanning them. The gas inlet 23 are arranged at the lower ends of the frame member 35, so that the gas inlet 23 are also arranged in a surface shape spanning the lower ends of the frame member 35.

Between the gas inlet 23 and the conductive film 35a of the frame member 35, and between the conductive film 35a of the frame member 35 and the cathode film 21 of the top board part 12 are connected electrically and mechanically by the same silver-type bonding material as that is used for bonding the anode wires 22 and the supporting conductive wires 32. Since the gas inlet 23 are connected to the conductive film 35a of the frame member 35 and the conductive film 35a is connected to the cathode film 21 of the top board part 12, the gas inlet 23 and the cathode film 21 are electrically connected.

As described above, the anode wires 22 are arranged in parallel to the cathode film 21 with the constant distance and in parallel to each other; and the gas inlet 23 are also arranged in parallel to the surface formed by the anode wires 22 with the constant distance and in parallel to each other. The anode wires 22 and the gas inlet 23 are arranged also in parallel to each other.

All of the cathode film 21, the anode wires 22, and the gas inlet 23 are made of conductive material with a small content of an α-ray emission element. For example, copper or aluminum is used as the cathode film 21; and tungsten wires of high purity (5N) are used as the anode wires 22 and the gas inlet 23. For example, in a case in which the tungsten wires are used, it is not easily cut even a diameter is not more than 10 μm since the strength is high.

Conductive materials are used also for the supporting conductive wires 32 and the conductive film 35a on the surface of the frame member 35, such as copper, copper alloy, aluminum, aluminum alloy, tungsten, tungsten alloy in which the total content of the α-ray emission elements such as uranium, thorium, lead and the like is less than 1 ppb. For example, a copper wire of high purity (5N) having a diameter of not less than 1 mm and not more than 10 mm is used as the supporting conductive wires 32.

It is preferable that a thickness of the cathode film 21 be not less than 100 nm and not more than 200 nm. The diameters of the anode wires 22 and the gas inlet 23 are both 30 μm or less; preferably, it is not less than 1 μm; more preferably, it is not less than 2 μm; even more preferably, it is not less than 10 μm. The interval (a wire distance) d1 between the anode wires 22 is preferably not less than 10 mm and less than 20 mm; more preferably, not less than 10 mm and not more than 19 mm. The interval (a wire distance) d2 between the anode wires 22 is preferably not less than 5 mm and not more than 10 mm; more preferably, not less than 5 mm and not more than 9 mm.

The surface formed by the anode wires 22 and the cathode film 21 face to each other with about 1000 cm². It is preferable to face at an area of 100 cm² to 1000 cm². A distance h1 between the cathode film 21 and a plane formed by these 22 and a distance h2 between the gas inlet 23 and a plane formed by the anode wires 22 are set to not less than 3 mm and less than 10 mm; preferably, not less than 3 mm and not more than 9 mm. The distance h1 and the distance h2 are the same value in the present embodiment, but they may be different.

In FIGS. 1 to 3, dimensions are partly magnified for convenience of explanation, so that a relation of the actual dimensions are not correctly shown.

The anode wires 22 and the gas inlet 23 are suspended in a state in which a tension of $1 \times 10^{-2}$ N or more and $5 \times 10^{-2}$ N or less (for example, $4 \times 10^{-2}$ N) is added.

A top surface of the bottom board part 13 of the box-shaped chamber 11 is a sample-holding surface 13a on which a sample S to be an object of measuring α-ray is placed. The bottom board part 13a is arranged below the gas inlet 23 which are disposed in a plane shape so as to be in parallel to the plane formed by the gas inlet 23. A distance h3 between the gas inlet 23 and an upper surface of the sample S placed on the bottom board part 13a is set to not less than 1 mm and not more than 3 mm. The sample S is fixed on the bottom board part 13a by an appropriate fixing device if necessary. The sample S is a metal board, a resin board, metal powder, resin powder, or the like, for example.

Among the four side board parts 14 of the box-shaped chamber 11, the gas inlet 2 is formed in one of the two side board parts 14 to which both ends of the anode wires 22 and the gas inlet 23 are opposed, and the gas outlet 3 is formed in the other. The gas inlet 2 and the gas outlet 3 are disposed below the side board parts 14 to be separated from the gas inlet 23 so as to flow gas from one corner of the box-shaped chamber 11 towards the diagonal corner. Since the gas inlet 2 and the gas outlet 3 are provided as described above, it is possible that a stream of gas in the box-shaped chamber 11 does not largely effect on the gas inlet 23 and the anode wires 22 by an inflow of gas, a vibration and a bend of the thin anode wires 22 and the thin cathode wires 23 are prevented, and measuring accuracy can be improved.

For the top board part 12, the bottom board part 13, and the side board parts 14 which form the box-shaped chamber 11 and the supporting rods 31, synthetic resin such as acrylic resin, polycarbonate resin and the like having a surface resistance of not less than $1.0 \times 10^{15} \Omega$ and not more than $1.0 \times 10^{16} \Omega$ is used. In the supporting rods 31, the insulation covering part 31b covering the rod body 31a is made of epoxy resin for example, and repair material of solder resist is applied on a surface thereof.

A metallic case 45 is provided to cover the whole of the box-shaped chamber 11 and ground-connected.

Using the α-ray measuring device 1 configured as above described, placing the sample S which is the measuring object on the bottom board part 13a of the bottom board part 13 in the box-shaped chamber 11, flowing in mixed gas of argon (Ar) and methane (CH4) through the gas inlet 2, and applying high voltage by the external power source between the cathode film 21, the gas inlet 23 and the anode wires 22, α-ray emitted from the sample S can be measured conforming JEDEC STANDARD JESD221.

It is preferable to use an external power source in which noise is reduced. For example, it is possible to reduce the noise by shielding an inner circuit substrate board of the external power source, providing a filter such as a ferrite core and the like on an electric power supply part of the external power source, and increasing a ground line of the external power source.

An appropriate gas flow rate is not less than 300 ml/min and not more than 400 ml/min.

In the α-ray measuring device 1 of the present embodiment, since the anode wires 22 and the gas inlet 23 are thin as not more than 30 μm, it is possible to measure α-ray without deteriorating the counting efficiency even when the voltage is relatively low.

Figure 4:
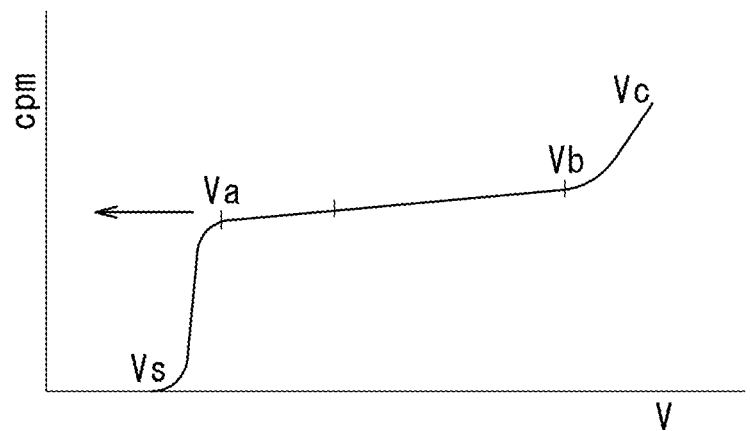
FIG. 4 is a diagram showing a relation of an applied voltage with counting efficiency.

FIG. 4 is a diagram showing a general relation between an applied voltage (V) and a counting efficiency (cpm: count/min); it is shown that there is a plateau region in which the counting efficiency is almost not changed even if the voltage changes. In measuring α-ray, generally, the minimum voltage Va in the plateau region is applied. In the α-ray measuring device 1 of the present embodiment, since the diameter of the anode wires 22 and the gas inlet 23 are thin as 30 μm or less, there is an effect of shifting the whole plateau region to a lower voltage side as shown by the arrow in FIG. 4. Thereby the α-ray can be measured without deteriorating the counting efficiency even in low voltage.

Accordingly, it is possible to measure α-ray of a low emission amount as 0.001 cph/cm$^2$ or lower in a short time with high reliability, for example.

The present invention is not limited to the above described embodiment. For example, in the above described embodiment, the cathode film 21 is disposed on the top board part 12 of the box-shaped chamber 11; and below them, the anode wires 22 and the gas inlet 23 are disposed in order, and the bottom board part 13a is arranged on the bottom board part 13. By contrast, it is applicable that the cathode film 21 is disposed on the bottom board part 13 and above them, the anode wires 22 and the gas inlet 23 are disposed in order, and a sample-holding surface is formed on the top board part 12.

In the above described embodiment, the supporting rods 31 holding the anode wires 22 is provided to penetrate the cathode film 21; however, it is not necessary to penetrate the cathode film 21. For example, the supporting conductive wires 32 may be disposed to span the side board parts 14 of the box-shaped chamber 11 and hold the anode wires 22.

In the above described embodiment, the conductive film 35a covering the whole surface of the frame member 35 holding the gas inlet 23 is provided so as to join the conductive film 35a to the cathode film 21; but it is not limited to this embodiment if the gas inlet 23 and the cathode film 21 are electrically connected (in a same electric potential).

EXAMPLES

α-rays were measured using the α-ray measuring device 1 having the parts configurations explained in the above described embodiment, by changing the following conditions.

Diameter of the anode wires 22 (μm)

Diameter of the gas inlet 23 (μm)

Distance h1 between the anode wires 22 and the cathode film 21 (*mm*)

Distance h2 between the anode wires 22 and the gas inlet 23 (*mm*)

Distance d1 between the anode wires 22 (*mm*)

Distance d2 between the gas inlet 23 (*mm*)

The sample S which is the measurement object was a rolled sheet of tin (Sn) in which the emission amount of α-ray was about 0.001 cph/cm$^2$.

Measuring conditions were: a measuring area of 1000 cm$^2$, a gas flow rate of 400 ml/min, counting efficient of 80% or more, and a measuring time of 100 hours or more.

Background values of the α-ray measuring device, applied voltage (Va) for measuring 0.001 cph/cm$^2$, and measuring time was measured. The results are shown in Table 1.

TABLE 1

| Test | Diameter of Wire (μm) | | Distance (mm) | | Wire Distance (mm) | | Applied Voltage (V) | Background value (c p h) | Measuring Time (hour) |
|---|---|---|---|---|---|---|---|---|---|
| | Anode | Cathode | h 1 | h 2 | d 1 | d 2 | | | |
| 1 | 100 | 120 | 15 | 15 | 30 | 10 | 1900 | 8 | 240 |
| 2 | 30 | 0.03 | 9 | 8 | 18.5 | 9 | 800 | 5 | 160 |
| 3 | 10 | 10 | 9 | 8 | 18.5 | 9 | 650 | 1 | 50 |
| 4 | 10 | 10 | 15 | 15 | 30 | 10 | 1330 | 5 | 160 |
| 5 | 10 | 10 | 12 | 5 | 18.5 | 9 | 550 | 3 | 100 |
| 6 | 10 | 10 | 10 | 7 | 18.5 | 9 | 550 | 1 | 50 |

As shown in Table 1, in a case in which the anode wires and the cathode wires both have the diameter of 30 μm or less, the background value was low and the time for measuring 0.001 cph/cm$^2$ was short. Especially, in the test 3 in which the wire diameters were both 10 μm, the time for measuring was short as 50 hours or less.

INDUSTRIAL APPLICABILITY

Without deteriorating the counting efficiency, α-ray can be measured by lower applied voltage, and the background was reduced, so that a sample of the low emission amount of α-ray can be measured in a short time.

REFERENCE SIGNS LIST

1 α-ray measuring device
2 Gas inlet
3 Gas outlet
11 Box-shaped chamber
12 Top board part
13 Bottom board part
13a Sample-holding surface
14 Side board part
21 Cathode film
22 Anode wire
23 Cathode wire
31 Supporting rod
31a Rod body
31b Insulation covering part
32 Supporting rod
35 Frame member
35a Conductive
41 Cable
41a Inner conductive wire
41b Outer conductive wire
42 Connector
45 Metallic case
S Sample

The invention claimed is:

1. An α-ray measuring device comprising:
a box-shaped chamber having a gas inlet and a gas outlet;
a cathode film provided inside the box-shaped chamber;
a plurality of anode wires, arranged in parallel to the cathode film with a distance and also in parallel to each other with a distance, electrically connected to each other, and having a diameter of 30 μm or less; and
a plurality of cathode wires, arranged in parallel to the anode wires with a distance and also in parallel to each other with distance, electrically connected to the cathode film, and having a diameter of 30 μm or less.

2. The α-ray measuring device according to claim 1, wherein the diameter of the anode wires and the diameter of the cathode wires are both 2 μm or more.

3. The α-ray measuring device according to claim 2, wherein the diameter of the anode wires and the diameter of the cathode wires are the same.

4. The α-ray measuring device according to claim 2, wherein a distance between the cathode film and the anode wires, and a distance between the anode wires and the cathode wires are both not less than 3 mm and less than 10 mm.

5. The α-ray measuring device according to claim 2, wherein a wire distance between the anode wires is not less than 10 mm and less than 20 mm and a wire distance between the cathode wire is not less than 5 mm and not more than 10 mm.

6. The α-ray measuring device according to claim 1, wherein the diameter of the anode wires and the diameter of the cathode wires are the same.

7. The α-ray measuring device according to claim 6, wherein a distance between the cathode film and the anode wires, and a distance between the anode wires and the cathode wires are both not less than 3 mm and less than 10 mm.

8. The α-ray measuring device according to claim 1, wherein a distance between the cathode film and the anode wires, and a distance between the anode wires and the cathode wires are both not less than 3 mm and less than 10 mm.

9. The α-ray measuring device according to claim 8, wherein the distance between the cathode film and the anode wires, and the distance between the anode wires and the cathode wires are both 9 mm or less.

10. The α-ray measuring device according to claim 1, wherein a wire distance between the anode wires is not less than 10 mm and less than 20 mm and a wire distance between the cathode wire is not less than 5 mm and not more than 10 mm.

11. The α-ray measuring device according to claim 10, wherein the wire distance between the anode wires is 19 mm or less.

12. The α-ray measuring device according to claim 10, wherein the wire distance between the cathode wires is 9 mm or less.

13. The α-ray measuring device according to claim 1, wherein between an inner surface of the box-shaped chamber and the anode wires, a plurality of rods made of insulation material and a plurality of supporting conductive wires made of conductive material with a content of α-ray emission element less than 1 ppb, fixed on the supporting rods and both ends of the anode wires, holding the anode wires and electrically connecting the anode wires to each other are provided; and wherein
the supporting rods comprise an inner insulation part having a rod shape in which a part penetrates a hole formed on the cathode film and is exposed in the box-shaped chamber, and an insulation covering part covering the exposed part of the inner insulation part in the box-shaped chamber.

14. The α-ray measuring device according to claim 13 provided with conductive bonding material fixing bonded parts of the anode wires and the supporting conductive wires.

15. The α-ray measuring device according to claim 13, wherein the supporting conductive wires are copper wires having a diameter of not less than 1 mm and not more than 10 mm.

16. The α-ray measuring device according to claim 1, wherein the gas inlet and the gas outlet are formed on side board parts between the cathode wires and a bottom surface in the box-shaped chamber.

17. The α-ray measuring device according to claim 1, wherein the cathode film is made of copper or aluminum.

18. The α-ray measuring device according to claim 1, wherein a thickness of the cathode film is not less than 100 nm and not more than 200 nm.

19. The α-ray measuring device according to claim 1, wherein the anode wires and the cathode wires are tungsten wires.

20. The α-ray measuring device according to claim 1, wherein the cathode film and a plane formed by the anode wires face to each other at an area of not less than 100 cm$^2$ and not more than 1000 cm$^2$.

* * * * *